United States Patent
Anttila et al.

(10) Patent No.: US 7,881,708 B2
(45) Date of Patent: Feb. 1, 2011

(54) MOBILE TERMINAL, AND AN ASSOCIATED METHOD, WITH MEANS FOR MODIFYING A BEHAVIOR PATTERN OF A MULTI-MEDIAL USER INTERFACE

(75) Inventors: Akseli Anttila, Helsinki (FI); Raphael Grignani, Helsinki (FI)

(73) Assignee: Nokia Corporation, Espoo (FI)

( * ) Notice: Subject to any disclaimer, the term of this patent is extended or adjusted under 35 U.S.C. 154(b) by 161 days.

(21) Appl. No.: 11/023,129

(22) Filed: Dec. 27, 2004

(65) Prior Publication Data
US 2006/0143298 A1  Jun. 29, 2006

(51) Int. Cl.
*H04M 3/00* (2006.01)
*H04W 24/00* (2009.01)
*H04M 3/42* (2006.01)

(52) U.S. Cl. .................. 455/418; 455/414.1; 455/414.2; 455/456.3

(58) Field of Classification Search .................. 455/418, 455/420, 414.1, 414.2, 456.1, 456.3, 456.6, 455/41.2
See application file for complete search history.

(56) References Cited

U.S. PATENT DOCUMENTS

| | | | |
|---|---|---|---|
| 6,650,894 B1 * | 11/2003 | Berstis et al. | 455/420 |
| 6,668,177 B2 * | 12/2003 | Salmimaa et al. | 455/566 |
| 6,757,530 B2 * | 6/2004 | Rouse et al. | 455/412.1 |
| 2002/0132610 A1 * | 9/2002 | Chaplin et al. | 455/414 |
| 2002/0142792 A1 | 10/2002 | Martinez | 455/550 |
| 2004/0216054 A1 * | 10/2004 | Mathews et al. | 715/765 |
| 2004/0259536 A1 | 12/2004 | Keskar et al. | 455/418 |
| 2004/0266409 A1 * | 12/2004 | Nielsen et al. | 455/414.2 |
| 2005/0085272 A1 * | 4/2005 | Anderson et al. | 455/566 |
| 2005/0215243 A1 * | 9/2005 | Black et al. | 455/417 |
| 2006/0135139 A1 * | 6/2006 | Cheng et al. | 455/418 |

FOREIGN PATENT DOCUMENTS

| | | |
|---|---|---|
| EP | 0 865 188 A2 | 9/1998 |
| EP | 1 162 853 A1 | 12/2001 |
| WO | WO 2004/057467 | 7/2004 |

OTHER PUBLICATIONS

Korean Office Action dated Apr. 7, 2008.
Chinese Office Action dated Apr. 29, 2010.

* cited by examiner

*Primary Examiner*—Un C Cho
(74) *Attorney, Agent, or Firm*—Perman & Green, LLP

(57) ABSTRACT

A mobile terminal having a multi-medial user interface, a controller and a memory is presented. The memory is adapted to store a plurality of profiles, each profile defining a respective behavior pattern of the multi-medial user interface and being definable by a user of the mobile terminal. The controller is adapted to provide a first control parameter representative of a desired profile as selected by the user. The controller is also adapted to provide a second control parameter representative of a contextual status of the mobile terminal. The controller is adapted to modify a behavior pattern of the multi-medial user interface depending on the first and second control parameters.

12 Claims, 6 Drawing Sheets

MOBILE TERMINAL, AND AN ASSOCIATED METHOD, WITH MEANS FOR MODIFYING A BEHAVIOR PATTERN OF A MULTI-MEDIAL USER INTERFACE

BACKGROUND OF THE INVENTION

1. Field of the Invention

The present invention relates to mobile telecommunication and more particularly to a mobile terminal having a multi-medial user interface and means for modifying a behavior pattern thereof.

2. Brief Description of Related Developments

A mobile (cellular) telephone for a telecommunications system like GSM, UMTS, D-AMPS or CDMA2000 is a common example of a mobile terminal according to the above. In recent years, mobile terminals have become a necessity in the everyday life of many people. The functionality of modern mobile terminals has expanded broadly, e.g. with the introduction of digital cameras and digital calendars in mobile telephones, thereby making mobile terminals attractive to persons who previously had no particular reason for using a mobile terminal. With the increased number of people using mobile terminals, personalization has become an important issue. Users may want to personalize their mobile terminals for at least two different reasons.

Firstly, having a heavy personalized mobile terminal in public areas such as locker rooms, conference halls, restaurants, etc, reduces the risk of confusing the user's terminal with someone else's terminal of the same brand and the same model. In order for a user to reduce the risk of mixing up his mobile terminal with other users' mobile terminals, the user must personalize the mobile terminal in some way.

A second reason behind personalization is the well-known human need for expressing herself—i.e., the same need that by way of example is also apparent from numerous car and motorcycle customizations, personalized multimedial layout of personal computers, wearing designer clothes, tattoos, piercings, extravagant hair cuts, etc.

One way of personalizing a mobile terminal is to change its casing. Today, it is possible to buy a specific model of a mobile telecommunications terminal and subsequently exchange the original casing for another casing of a different color or with a different surface pattern. Hence, to some extent, the mobile terminal will be personalized by the exchanged casing. However, the number of different exchange casings available for a specific model of a mobile terminal is often quite limited.

Another approach to personalize a mobile terminal is to select one theme among a plurality of predefined themes in the mobile terminal. In many mobile terminals it is possible to simultaneously change a background image displayed on the terminal's display screen and the sounds used for indicating incoming telephone calls and messages (such as SMS, EMS, MMS etc) by selecting a particular theme. For example, selecting a "Christmas" theme may cause the display background to show a snowy Christmas landscape with Santa Claus and his reindeers, set the ringtone for incoming calls to "Jingle Bells" and set the alert signal for an SMS arrival to "Frosty the Snowman". In addition to the predefined themes stored in the mobile terminal, the user may also download further themes from a server on the Internet. WO 2004/057467 discloses a mobile terminal upgrading system in which content packages including themes may be downloaded in this way.

A similar concept for personalization is the use of profiles. A profile is a set of settings that define the behavior of various functionality of the mobile terminal in a certain context. Thus, many mobile terminals have predefined and editable profiles for, e.g., handsfree mode, silent mode, connected to PC, office, meeting and default (normal). The settings of each profile typically specify the behavior of the terminal's illumination (light), ring tone, keypad sound, warning tones, sound volume, vibration, call diversion, network availability, etc.

EP-0 865 188 discloses a mobile terminal with different profiles (which are referred to as "phone setting modes"). The user may define new profiles and edit existing ones. In EP-0 865 188, the personalization and the user convenience are extended by introducing automatic selection of which profile that is to be currently active in response to a current change in context. To this end, the mobile terminal in EP-0 865 188 has a plurality of detectors 12, 13, 14, 15, 16 each capable of supplying a control parameter representing the current context. A CPU and a controller in the mobile terminal receive the control parameters thus detected and searches a predefined table that matches control parameter values and profiles. In case of a match, the matching profile is automatically set as the active one.

While the approach in EP-0 865 188 has its benefits, there is on the other hand a risk of inconvenience, since the user cannot interact in the continuous process for selection of active profile; this is entirely handled by the automatic control process described above. Thus, the user may sometimes experience that his terminal switches profiles out of his control, e.g. too often or at unexpected occasions. There is a possibility for the user to select between automatic-mode profile selection and manual-mode profile selection (see mode selection box 27 in FIG. 2), but if manual mode is selected, the user is left with purely manual operation and all the benefits of the automatic control process are lost.

It is therefore believed to be desirable to provide a new manner of personalization that combines the advantages of manual and automatic control to modify a current behavior pattern of a multi-medial user interface for a mobile terminal.

SUMMARY OF THE INVENTION

In view of the above, an objective of the invention is to solve or at least reduce the problems discussed above.

Generally, the above objectives are achieved by the attached independent patent claims.

A first aspect of the invention is a mobile terminal having a multi-medial user interface, a controller and a memory, said memory being adapted to store a plurality of profiles, each profile defining a respective behavior pattern of said multi-medial user interface and being definable by a user of the mobile terminal, wherein said controller is adapted to provide a first control parameter representative of a desired profile as selected by said user;

said controller is adapted to provide a second control parameter representative of a contextual status of said mobile terminal; and said controller is adapted to modify a behavior pattern of said multi-medial user interface depending on said first and second control parameters.

As used herein, "behavior pattern" of a "multi-medial user interface" may pertain to any visual, audio and/or tactile user interface element included in the user interface, or any combination of such elements, or any function associated with such elements, or any appearance of such elements.

In one embodiment, the mobile terminal has an operating system and a plurality of software applications executable in said operating system, said software applications including a profile editor application having functions allowing said user to create, edit and delete profiles.

At least another application, different from said profile editor application, may be included among said software applications, said another application being able to store application data in said memory, said application data including attribute data for controlling the behavior pattern of said multi-medial user interface.

Said attribute data of said another application may contain a representation of said first control parameter. The attribute data of said another application is advantageously definable by said user.

Said second control parameter may be generated upon a change in context of said another application.

In one embodiment, said another application is a Calendar application and said change in context pertains to the occurrence of a calendar event.

Said second control parameter may be generated in response to at least one of the following:

the occurrence of a predefined event in a software application of said mobile terminal;

the presence of a communication device, such as a Bluetooth device, in a proximity of said mobile terminal;

an output from a real-time clock, such as a current time and/or a current date; and location data pertaining to a current location of said mobile terminal, wherein said location data may relate to at least one of the following:

positional data derived from a Global Positioning System (GPS); and a cell ID or base station ID in a mobile telecommunications system in which the mobile terminal is operative.

The mobile terminal may advantageously be a mobile phone adapted for use in a mobile telecommunications network in compliance with a mobile telecommunications standard such as GSM, UMTS, D-AMPS or CDMA2000.

The controller may be or include a CPU ("Central Processing Unit"), DSP ("Digital Signal Processor") or any other electronic programmable logic device or combination of devices.

A second aspect of the invention is a method of controlling a behavior pattern of a multi-medial user interface for a mobile terminal, the mobile terminal having a plurality of profiles, each profile defining a respective behavior pattern of said multi-medial user interface and being definable by a user of the mobile terminal, the method involving the steps of:

detecting a contextual status of said mobile terminal; and modifying the behavior pattern of said multi-medial user interface in response to the contextual status detected as well as a desired profile as selected by said user.

Said contextual status may be detected as a change in context of a software application executing in said mobile terminal.

Said application may be a Calendar application, and said change in context may pertain to the occurrence of a calendar event.

Said contextual status may be detected as one of the following:

the occurrence of a predefined event in a software application of said mobile terminal;

the presence of a communication device in a proximity of said mobile terminal;

an output from a real-time clock, such as a current time and/or a current date; and location data pertaining to a current location of said mobile terminal.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF THE INVENTION

Figure 1:
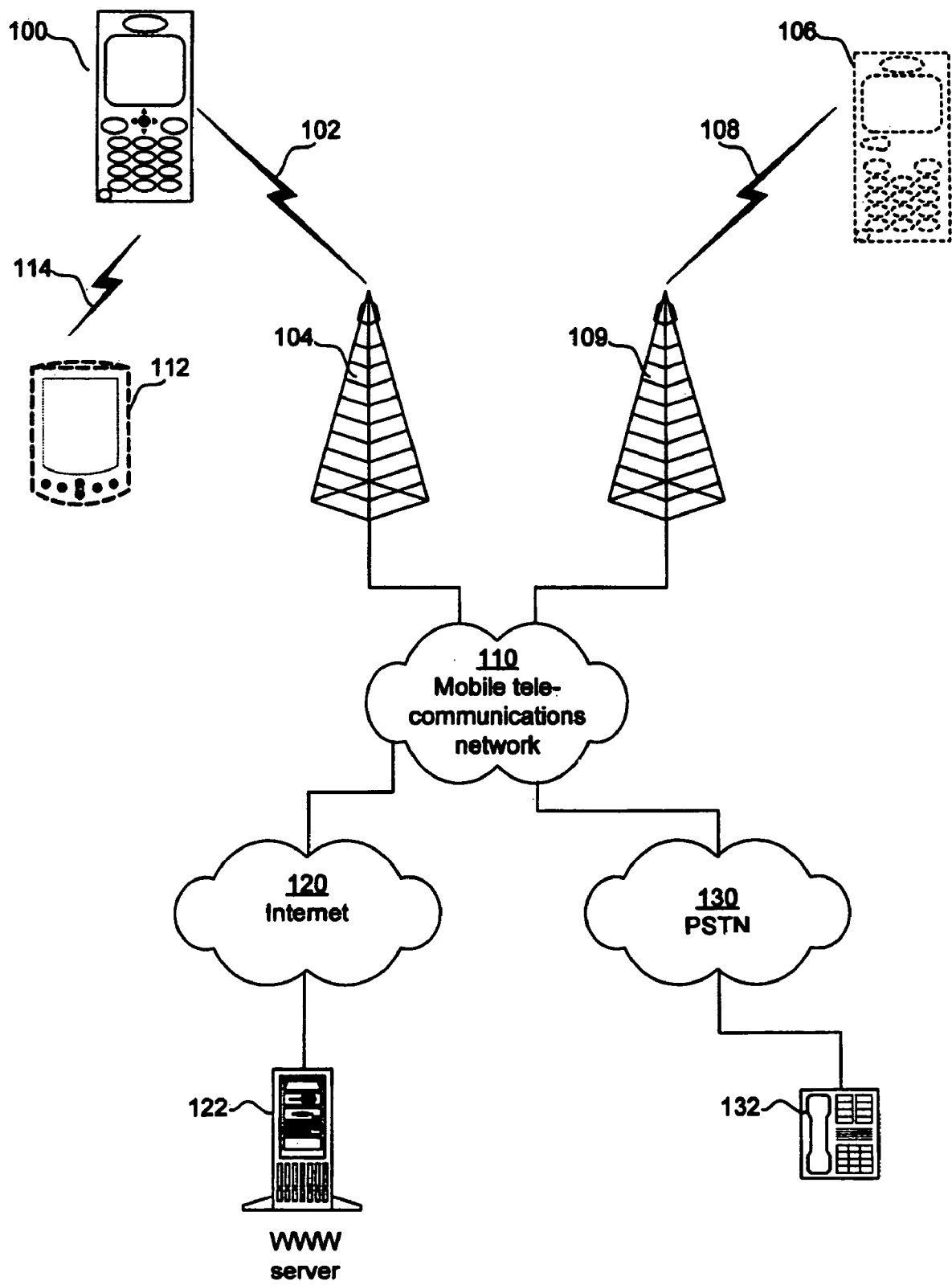
FIG. 1 is a schematic illustration of a telecommunication system, including a mobile terminal, a mobile telecommunications network and a couple of other devices, as an example of an environment in which the present invention may be applied.

FIG. 1 illustrates one example of a telecommunications system in which the invention may be applied. In the telecommunication system of FIG. 1, various telecommunications services such as voice calls, data calls, facsimile transmissions, music transmissions, still image transmissions, video transmissions, electronic message transmissions and electronic commerce may be performed between a mobile terminal 100 according to the present invention and other devices, such as another mobile terminal 106, a PDA 112, a WWW server 122 and a stationary telephone 132. It is to be noticed that for different embodiments of the mobile terminal 100, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS or CDMA2000.

The mobile telecommunications network 110 is operatively connected to a wide area network 120, which may be Internet or a part thereof. Various client computers and server computers, including WWW server 122, may be connected to the wide area network 120.

A public switched telephone network (PSTN) 130 is connected to the mobile telecommunications network 110 in a familiar manner. Various telephone terminals, including stationary telephone 132, are connected to the PSTN 130.

Figure 2:
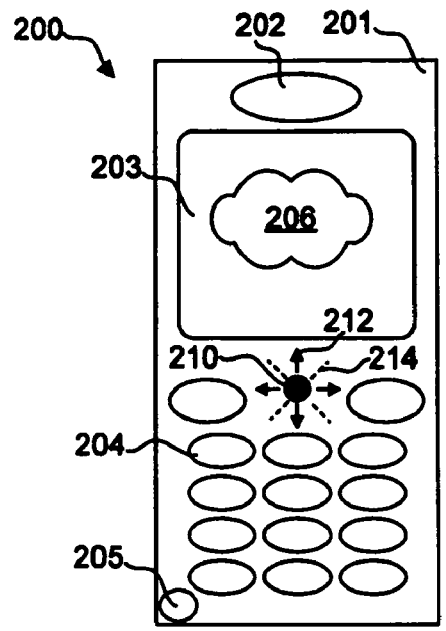
FIG. 2 is a schematic front view illustrating a mobile terminal according to one embodiment, and in particular some external components that are part of a user interface towards a user of the mobile terminal.
Figure 4:
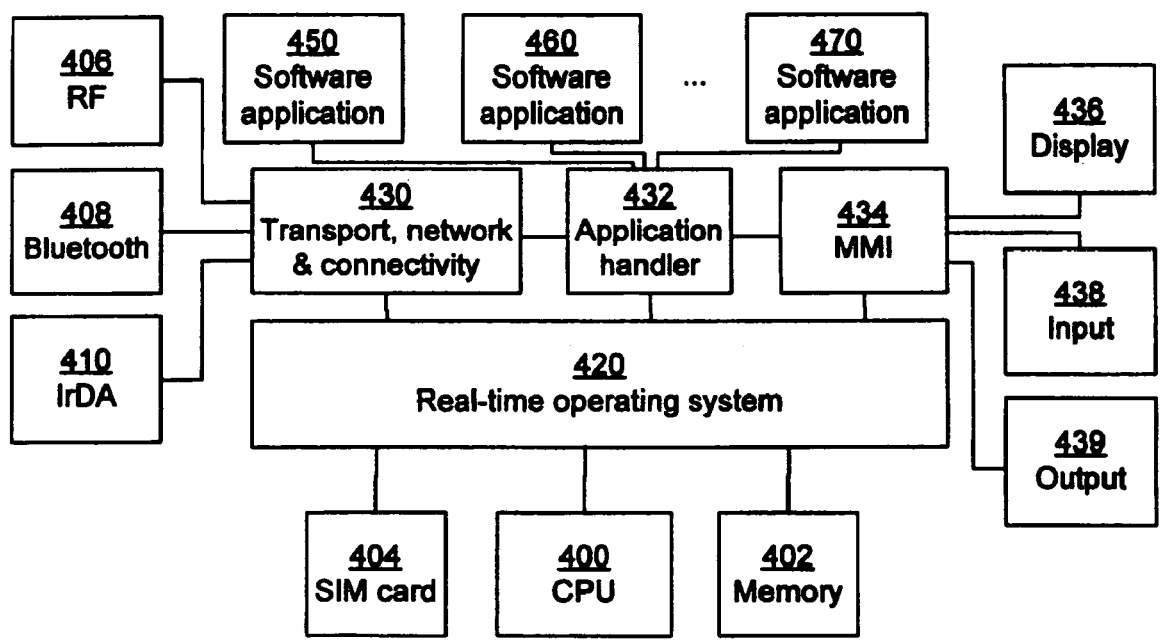
FIG. 4 is a schematic block diagram representing the general internal component and software structure of a mobile terminal according to one embodiment.

An embodiment 200 of the mobile terminal 100 is illustrated in slightly more detail in FIG. 2. As is well known in the art, the mobile terminal 200 comprises an apparatus housing 201, a loudspeaker 202, a display 203, a set of keys 204 which may include a keypad of common ITU-T type (alpha-numerical keypad), and a microphone 205. In addition, but not shown in FIG. 2, the mobile terminal 200 comprises various internal components, the more important of which are illustrated in FIG. 4 and will be described later. External components 202-205 are all part of the user interface of the mobile terminal.

Furthermore, the user interface involves a multi-way input device 210 in the form of a joystick, the handle of which may be actuated by the user in a plurality of directions 212/214 so as to command navigating operations, i.e. to navigate in corresponding directions among information 206 shown on display 203, in a manner which is conventional per se for joystick-equipped mobile terminals. The navigation directions may be 4 in number, as indicated by solid arrows 212 in FIG. 2a, and may be distributed orthogonally in an "up, down, left, right" or "north, south, west, east" fashion with respect to a base plane which is essentially coincidental or parallel with the display 203 and the front surface of apparatus housing 201. Alternatively, the navigation directions may be 8 in number, as indicated by dashed lines 214 together with solid arrows 212 in FIG. 2a, and may be distributed around a virtual circle in aforesaid base plane with successive 450 displacements, representing corresponding actuations of the joystick handle by the user.

The user may also perform a selecting operation among information 206 by actuating the joystick 210 in a direction perpendicular to the base plane, e.g. by depressing the joystick at its top. Depending on implementation, this will either cause displacement of the entire joystick handle, or will cause depression of a joystick select button. In some embodiments such a joystick select button may be located at the top of the joystick handle; in others it may be mounted next to the joystick handle on the base plane.

The internal component and software structure of a mobile terminal according to one embodiment will now be described with reference to FIG. 4. The mobile terminal has a controller 400 which is responsible for the overall operation of the mobile terminal and is preferably implemented by any commercially available CPU ("Central Processing Unit"), DSP ("Digital Signal Processor") or any other electronic programmable logic device. The controller 400 has associated electronic memory 402 such as RAM memory, ROM memory, EEPROM memory, flash memory, or any combination thereof. The memory 402 is used for various purposes by the controller 400, one of them being for storing data and program instructions for various software in the mobile terminal. The software includes a real-time operating system 420, man-machine interface (MMI) drivers 434, an application handler 432 as well as various applications 450-470. The applications may include a call handling application, a contacts (phonebook) application, a messaging application, a calendar application, a control panel application, a camera application, a mediaplayer, a video game, a notepad application, a WAP/WWW browser, etc.

The MMI drivers 434 cooperate with the display 436 as well as various other I/O devices 438-439 such as a microphone, a speaker, a vibrator, a keypad, a joystick, a ringtone generator, an LED indicator, volume controls, etc. As is commonly known, a user may operate the mobile terminal through the man-machine interface thus formed.

The software also includes various modules, protocol stacks, drivers, etc., which are commonly designated as 430 and which provide communication services (such as transport, network and connectivity) for an RF interface 406, and optionally a Bluetooth interface 408 and/or an IrDA interface 410. The RF interface 406 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analog and digital electronic components, together forming a radio receiver and transmitter. These components include, i.a., band pass filters, amplifiers, mixers, local oscillators, low pass filters, AD/DA converters, etc.

The mobile terminal also has a SIM card 404 and an associated reader. As is commonly known, the SIM card 404 comprises a processor as well as local work and data memory.

Figure 3:
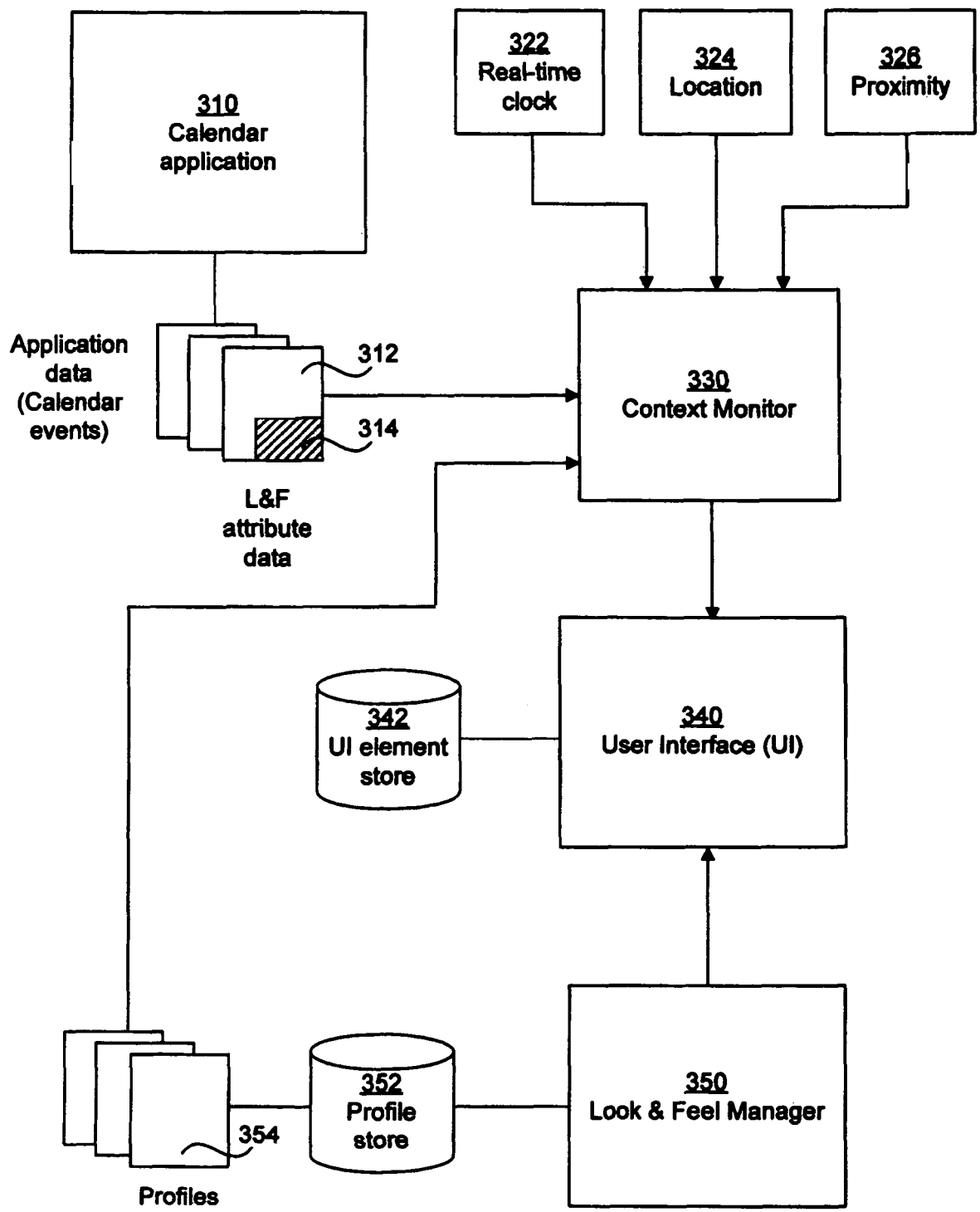
FIG. 3 is a schematic block diagram representing the software structure of a mobile terminal according to one embodiment.

Reference is now made to FIG. 3. This drawing illustrates a software structure that provides dynamic and flexible modification of the behavior pattern of a multi-medial user interface 340 of the mobile terminal 100, 200. The software structure involves a Look & Feel Manager 350, a Context Monitor 330 and at least one application 310 among aforesaid software applications 450-470. In FIG. 3, this application 310 is a Calendar application.

The user interface 340 is multi-medial, i.e. it involves visual components (such as display screen backgrounds, screen savers, menu systems, buttons, dialog boxes, welcome message, etc) as well as audio components (such as ring tones, alert signals, keypad sounds, etc) and tactile components (such as a vibrator signal). These various components are defined and represented by UI elements in a UI element store 342.

The Look & Feel Manager 350 allows a user to create, edit and delete profiles at his will, i.e. it is a profile editor. Existing profiles 354 are stored in a profile store 352. Thus, each profile 354 will define a desired behavior pattern of the user interface 340, i.e. its "look and feel", in a given context. A profile may contain a specification of a single UI component or a combination of several UI components. The profile may also define the context under which the profile should be applied. For instance, the user may define a profile to handle the following exemplifying situation:

Assume that the user has designed a silly ringtone for his boss. Every time his boss calls him, this silly ringtone should be played. However, the user wants to avoid trouble in case the boss should actually hear the silly ringtone assigned to him. Therefore, the user creates a profile called "Boss". In this profile, the user specifies that every time the boss is in the immediate vicinity (as detected by a proximity module 326 that may act on Bluetooth ID, etc), the silly ringtone should not be used as ring signal but instead a standard ringtone. This new profile may be defined by a chain of commands in the Look & Feel Manager 350: "New profile>Change ringtone>For Contact>Select Contact>Choose new ringtone>Context>Proximity>Validate".

The user may also use the Look & Feel Manager 350 for manually selecting any available profile 354 to be the currently active one. Upon such manual selection, the Look & Feel Manager 350 will "execute" the selected profile, i.e. control the user interface 340 modify its multi-medial behavior pattern in accordance with the specifications of the selected profile. Thus, the "first control parameter" which was mentioned in the Summary section may be represented by such manual selection of profile in the Look & Feel Manager 350.

More than one profile may be active at the same time, provided that there are no conflicts in their specifications. In case of a conflict, specifications in the more recently selected active profile will prevail. An active profile may also be manually deactivated by the user through the Look & Feel Manager 350.

Figure 5:
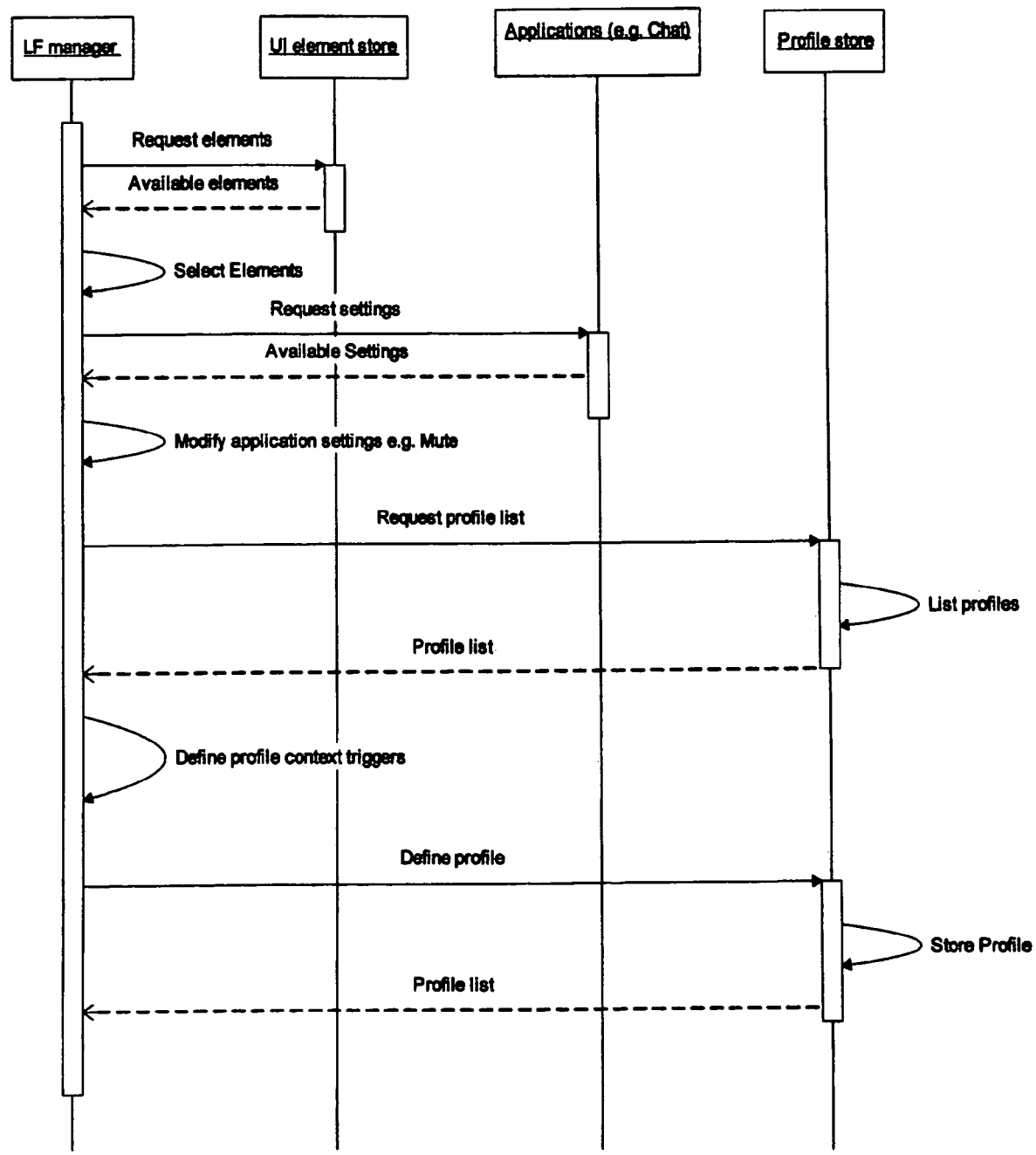
FIG. 5 is a diagram that illustrates the interaction between different software components when a user defines a new profile in a Look & Feel Manager application.

FIG. 5 illustrates in more detail the interaction between different software components when a user defines a new profile in the Look & Feel Manager 350.

The Look & Feel Manager 350 is not the only place where the user may define the look and feel of his terminal. As seen in FIG. 3, the user may create calendar events 312 for meetings, anniversaries, reminders, etc, in the Calendar application 310. When defining such a calendar event, the user has the opportunity to specify Look & Feel attribute data 314. This attribute data may designate one of the available profiles 354, or a modified version of any of them, or generally any set of rules for the multi-medial behavior pattern of the user interface that are to be applied when the calendar event in question occurs. Thus, aforementioned "first control parameter" may also be represented by such Look & Feel attribute data 314 as specified by the user.

Figure 7:
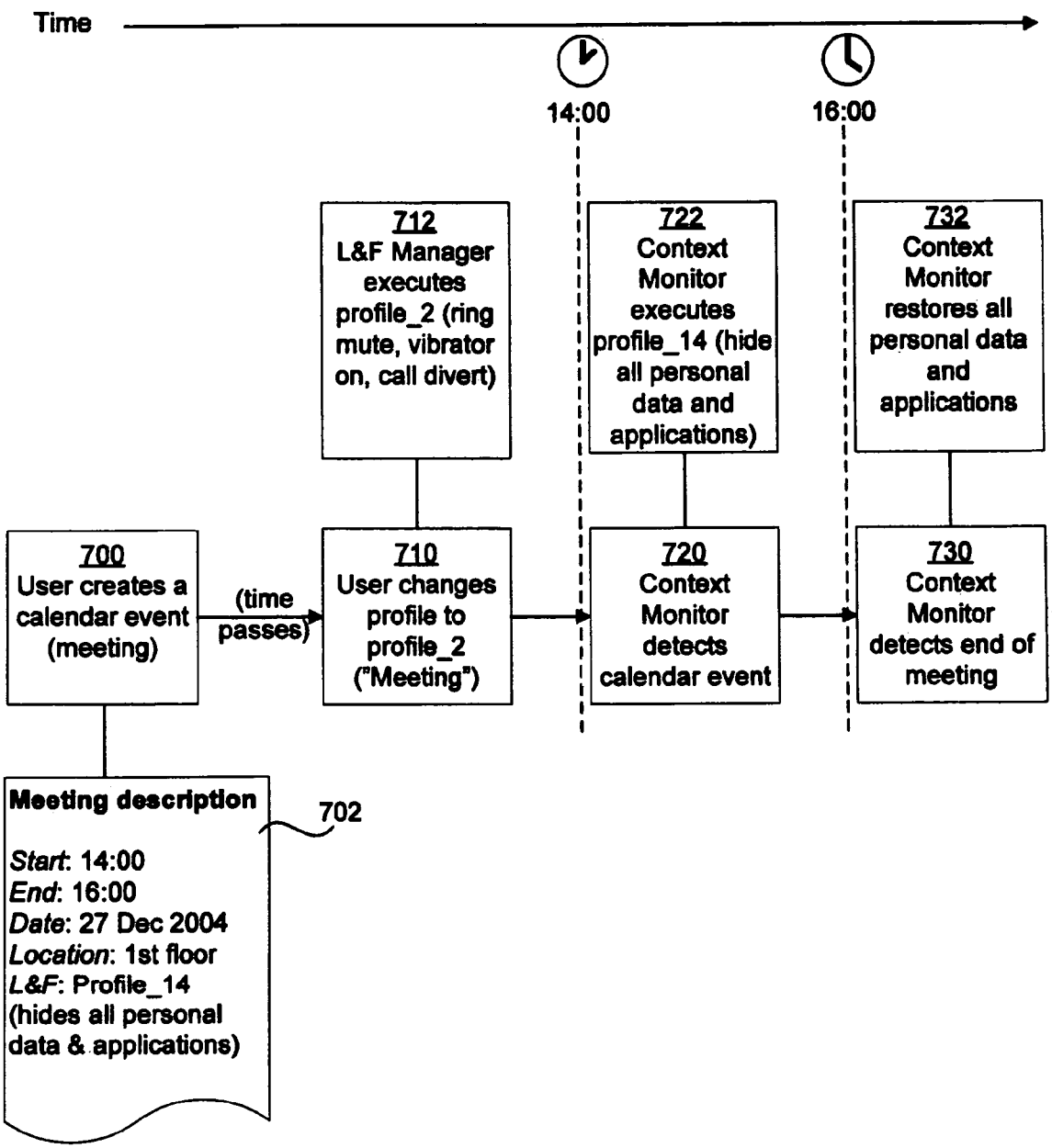
FIG. 7 illustrates a use case which demonstrates an example of how profiles may be set both manually and automatically according to the invention.

One example of the above will be given later with reference to FIG. 7. Also other applications than Calendar may have Look & Feel attribute data specified as part of their application data. For instance, in a Bluetooth application a profile may be specified which is to be used when pairing a device. In a Chat application, different profiles may be used depending on whether or not particular remote users are attending. In a Presence application, different profiles may be linked to the presence or non-presence of a certain communication device in proximity of the mobile terminal (as detected e.g. by way of the Bluetooth ID of such communication device).

The Context Monitor 330 serves to monitor for any context change, i.e. change in status for the mobile terminal, any of its applications or in its environment, that may trigger activation of any of the profiles 354. Therefore, Context Monitor 330 is susceptive of input data from a real-time clock 322, from a Location detector 324 and from the Proximity application 326. In this way, the Context Monitor 330 may identify the current date and/or time, the current location of the mobile terminal (in the form of GPS information or a current cell/base station ID), and the current presence of other devices.

The Context Monitor 330 is also susceptive of input from any and all application, such as the Calendar application 310, which has application data 312 that includes Look & Feel attribute data 314 as described above. In this way, the Context Monitor 330 will be informed of all relevant events in the applications that it monitors.

Moreover, the Context Monitor 330 has access to the profiles 354. Hence, the Context Monitor 330 may regularly check all available profiles to determine whether any of them has a defined usage context that matches the current context and thus should be activated.

Any of the different inputs to the Context Monitor 330 may represent the "second control parameter", as mentioned in the Summary section.

Figure 6:
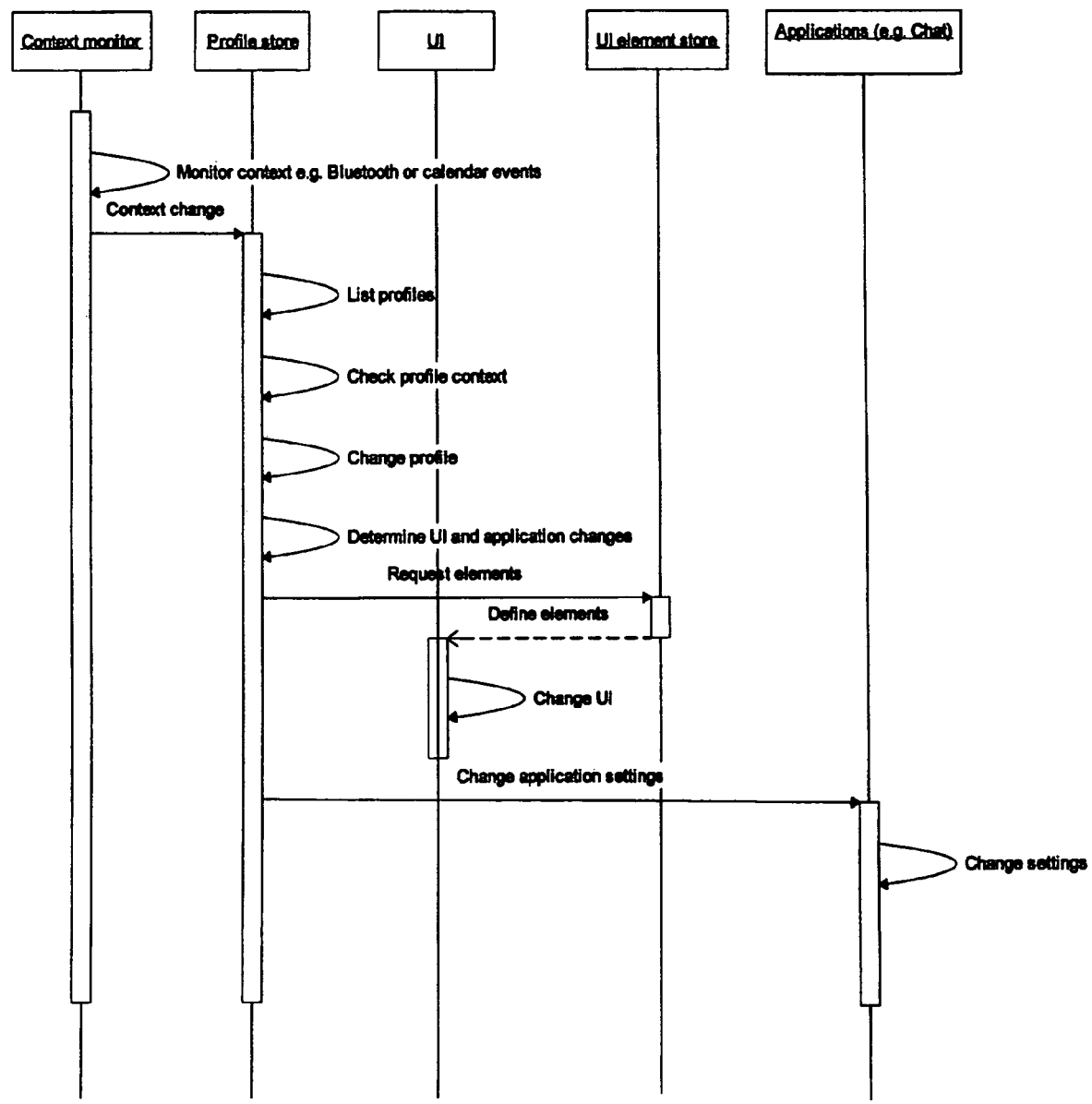
FIG. 6 is a diagram that illustrates the interaction between different software components when a Context Monitor program detects a change in context that triggers a switch in profiles.

Whenever the Context Monitor 330 has determined that a change in context has occurred that calls for modification of the mobile terminal's multi-medial behavior pattern, the Context Monitor 330 will command the user interface 340 to perform the required modifications. FIG. 6 illustrates in more detail how this is performed.

A use case will now be described with reference to FIG. 7. This use case will demonstrate an example of how profiles may be set both manually and automatically according to the invention.

In step 700, at some moment in the past, the user has entered the Calendar application 310 (FIG. 3) and created a calendar event 312 for a future meeting. In more detail, the calendar event contains a meeting specification 702 which, in a normal way, defines necessary data for the meeting, such as start time, end time, date, location, etc. In addition, the user specifies Look & Feel attribute data 314 by indicating a certain multi-medial behavior pattern that the user wants the mobile terminal to apply when the actual meeting occurs. As already explained, this may be defined in different ways; in FIG. 7 it is assumed that the user selects an existing profile, Profile_14, among the available profiles 354. Profile_14 specifies that all personal data and applications are to be removed from display on the mobile terminal.

Some time passes. Shortly before the start of the meeting on the designated date, in step 710 the user manually changes profile in the Look & Feel Manager 350 to Profile_2 (a predefined "Meeting" profile). The Look & Feel Manager 350 executes the selected profile immediately and commands the user interface 340 to adopt its multi-medial behavior pattern accordingly in step 712. This may involve actions like muting the ring signal, enabling the vibrator and applying call diversion.

At the designated start time for the meeting, 14:00 on 27 Dec. 2004, the Context Monitor 330 detects the occurrence of calendar event 702 in step 720. The Context Monitor 330 immediately proceeds to step 722 and executes the profile defined in the calendar event 702, i.e. Profile_14. The user interface 340 is accordingly commanded by Context Monitor 330 to modify its multi-medial behavior pattern. As already mentioned, this involves hiding all personal data and applications. All personal messages disappear from the Messaging application, the buddy list in the Chat application is hidden, games are no longer available in the menu system, personal bookmarks in the WAP/WWW browser are removed, etc.

When the meeting ends, at 16:00, the Context Monitor 330 detects this in step 730 and restores, in step 732, all personal data and applications so that they again will be available to the user. Therefore, in effect, the Context Monitor 330 "undoes" all actions performed at the beginning of the meeting, and Profile_14 no longer applies. The manually set meeting profile Profile_2, on the other hand, still applies, and the user will have to either select another profile or manually turn the ring signal back on, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
a multi-medial user interface,
a controller, and
a memory configured to store a plurality of profiles, each profile defining a respective behavior pattern of said multi-medial user interface and being definable by a user of the apparatus, wherein
said controller is configured to provide a first control parameter representative of a desired profile selected by the user in combination with one or more look and feel attributes applied from an application initiated by the user, wherein the look and feel attributes are specified by said user;

said controller is configured to provide a second control parameter representative of a contextual status of said mobile terminal; and said controller is configured to modify a behavior pattern of said multi-medial user interface depending on said first and second control parameters;

wherein said second control parameter is generated in response to at least one of the following:

the occurrence of a predefined event in the application of said mobile terminal;

the presence of a communication device in a proximity of said mobile terminal;

an output from a real-time clock, such as a current time and/or a current date;

and location data pertaining lo a current location of said mobile terminal.

2. The apparatus of claim 1, comprising an operating system wherein the application includes a plurality of software applications executable in said operating system, said software applications including a profile editor application having functions allowing said user to create, edit and delete profiles.

3. The apparatus of claim 2, wherein said software applications include at least another application, different from said profile editor application, said another application being able to store application data in said memory, said application data including additional look and feel attributes for controlling the behavior pattern of said multi-medial user interface.

4. The apparatus of claim 3, wherein said second control parameter is generated upon a change in context of said another application.

5. The apparatus of claim 4, wherein said another application is a Calendar application and said change in context pertains to the occurrence of a calendar event.

6. The apparatus of claim 3, wherein the look and feel attributes of said another application are definable by said user.

7. The apparatus of claim 1, wherein said communication device is a Bluetooth device.

8. The apparatus of claim 1, wherein said location data relates to at least one of the following:

positional data derived from a Global Positioning System (GPS); and a cell ID or base station ID in a mobile telecommunications system in which the mobile terminal is operative.

9. The apparatus of claim 1, in the form of a mobile phone for use in a mobile telecommunications network.

10. A method comprising:

defining one or more behavior patterns of a multi-medial user interface of an apparatus using a plurality of user definable profiles;

detecting a contextual status of said mobile terminal; and modifying the behavior pattern of said multi-medial user interface in response to the detected contextual status, and a combination of a desired profile of the plurality of user definable profiles selected by a user and one or more look and feel attributes applied from an application initiated by the user, wherein the look and feel attributes are specified by a user, the method further comprising detecting the contextual status as one of the following:

the occurrence of a predefined event in the application of said apparatus;

the presence of a communication device in a proximity of said apparatus;

an output from a real-time clock, such as a current time and/or a current date; and location data pertaining to a current location of said apparatus.

11. The method of claim 10, comprising detecting the contextual status as a change in context of the application executing in said apparatus.

12. The method of claim 11, wherein said application is a Calendar application and said change in context pertains to the occurrence of a calendar event.

* * * * *